United States Patent [19]
Maass

[11] 3,784,913
[45] Jan. 8, 1974

[54] SPEEDOMETER
[75] Inventor: Edward Ralph Maass, Auburn, Mass.
[73] Assignee: Curtis & Marble Machine Co., Worcester, Mass.
[22] Filed: Apr. 2, 1973
[21] Appl. No.: 347,054

Related U.S. Application Data
[63] Continuation of Ser. No. 171,502, Aug. 13, 1971, abandoned.

[52] U.S. Cl. .................................. 324/173, 235/95
[51] Int. Cl. ............................................. G01p 3/48
[58] Field of Search................... 324/161, 166, 168, 324/169, 171, 167, 173–175; 73/517, 518, 519; 235/95–97, 92 A, 92 DN

[56] References Cited
UNITED STATES PATENTS
3,293,636  12/1966  Dunne ................................ 324/173
3,502,984  3/1970  Mincuzzi............................ 324/169

FOREIGN PATENTS OR APPLICATIONS
1,195,532  6/1970  Great Britain..................... 324/171
1,173,675  7/1964  Germany .......................... 324/173

Primary Examiner—Michael J. Lynch
Attorney—Norman S. Blodgett

[57] ABSTRACT

A speedometer having a transmitter to emit electrical pulses and a receiver to receive the pulses, the meter and a motor being connected to the receiver to indicate speed and distance of travel.

3 Claims, 10 Drawing Figures

PATENTED JAN 8 1974

EDWARD R. MAASS
INVENTOR.

BY
Marvin S. Blodgett

SPEEDOMETER

This is a continuation, of application Ser. No. 171,502 filed Aug. 13, 1971 now abandoned.

BACKGROUND OF THE INVENTION

It is a common practice in automotive vehicles to include among the instrumentation a speedometer which not only shows the speed of travel but also the distance of travel. In the past, such speedometers have usually been mechanical and have been driven through a cable, one end of the cable being rotated by a rotatable part of the drive train of the vehicle and the other end of the cable being connected to the speedometer to rotate the driven parts. While such speedometers operate well for a short while and have the adventage of being inexpensive, they do not lend themselves to motor vehicles that are being driven continuously for long mileage. They are particularly difficult to use with vehicles in which the rotational part of the drive train that the original cable motion is to be taken from is located a considerable distance from the instrument panel. In commercial vehicles, it is important that the odometer be accurate, since maintenance is usually based on such mileage. The vehicle is driven by various persons and the organization usually has a large number of vehicles, so that it is impossible for anyone to remember when a vehicle is to be serviced, unless such service is set up on the basis of the odometer reading. When the cable breaks (as they often do) and this fact is not noticed or taken care of for a long period of time, the odometer reading is, of course, not consistent with the actual mileage on the vehicle. Furthermore, such commercial vehicles are usually driven at the top speed limit and, when the speedometer is not working because the cable is broken or the other mechanism is not operative, the driver is liable to be held up in his trip by a speeding violation. Since commercial vehicles are set up on fairly strict time schedules, the interruption of the trip for such a reason can present considerable problems to the organization. These and other difficulties experienced with the prior art devices have been obviated in a novel manner by the present invention.

It is, therefore, an outstanding object of the invention to provide a speedometer which has no rotating cable and, therefore, is incapable of presenting difficulties with the breakage of such a cable.

Another object of this invention is the provision of a speedometer and odometer system making use of sophisticated electrical apparatus.

A further object of the present invention is the provision of a speedometer which is very accurate, not only in the odometer reading but also in the speed indication.

It is another object of the instant invention to provide a speedometer which is capable of long service life, because of the fact that it has few moving mechanical parts.

A still further object of the invention is the provision of a speedometer using printed circuits and solid state electronic apparatus arranged in a compact unit.

It is a further object of the invention to provide a speedometer in which wearing parts have been reduced to a minimum and in which torque and friction in bearing surfaces have been minimized.

With these and other objects in view, as will be apparent to those skilled in the art, the invention resides in the combination of parts set forth in the specification and covered by the claims appended hereto.

SUMMARY OF THE INVENTION

In general, the invention consists of a speedometer having a transmitter including a rotatable shaft adapted to be connected to a rotating part of a prime mover and including sender means to emit electrical pulses in accordance with the rotation of the shaft. A receiver is electrically connected to the said means to receive the electrical pulses and a meter is connected to the receiver, the meter having a needle whose position is indicative of the instantaneous speed of the said prime mover. A stepping motor is also connected to the receiver and has an output shaft whose rate of rotation depends on the rate of pulse reception and is indicative of the speed of the prime mover; the motor is connected to a mechanical odometer which indicated the accumulation of movement of the prime mover.

More specifically, the receiver includes a disk-like plate on which the meter, motor, and odometer are mounted. A pulse-shaper and driver circuit is mounted on the plate in the form of a printed circuit using solid state elements.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
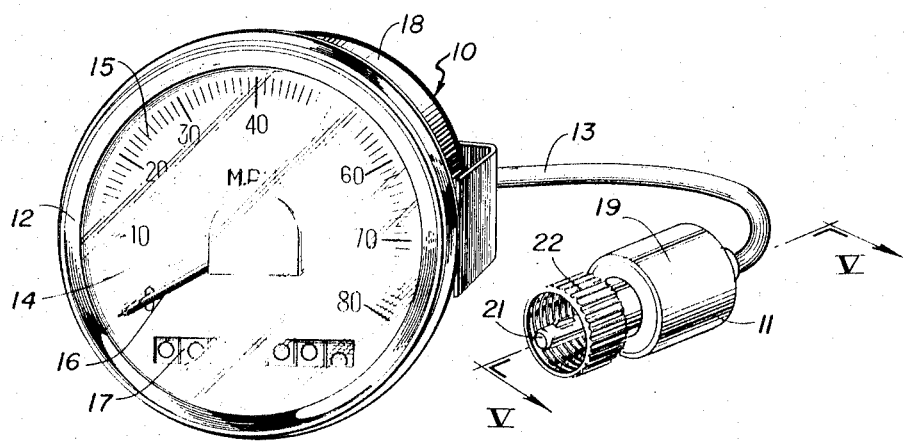
FIG. 1 is a perspective view of a speedometer embodying the principles of the present invention.

Referring first to FIG. 1, wherein are best shown the general features of the invention, the speedometer, indicated generally by the reference numeral 10, is shown as consisting of a transmitter 11 and a receiver 12 connected by a cable 13. For the purpose of this description, it will be understood that the expression "speedometer" is used in the conventional way to indicate an instrument which not only reads the instantaneous speed of a vehicle, but also includes an odometer for measuring the distance of travel. The receiver has a face plate 14 which is provided with a scale 15 for indicating speed in conjunction with a needle 16. The face plate is also provided with an aperture through which can be seen the reading on an odometer 17. The elements of the speedometer are enclosed in a housing 18 in the usual way, the housing being sealed against the entrance of liquid or dust and being adapted to be mounted in the instrument panel of a motor vehicle having a prime mover for driving it along the high way.

The transmitter 11 is shown as having a cylindrical housing 19 having one open end from which extends a drive shaft 21 adapted to be keyed to the drive train the prime mover of the vehicle. A threaded sleeve 22 is rotatably mounted on the open end of the housing in order to fasten it to a suitably threaded fitting associated with that portion of the prime mover from which rotational movement is to be taken.

Figure 2:
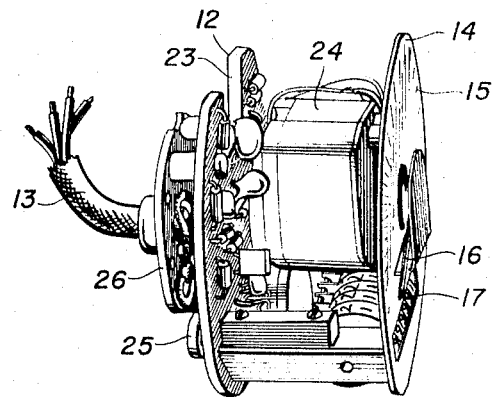
FIG. 2 is a side perspective view of a portion of the speedometer with housing removed.

FIG. 2 shows the receiver with the housing 18 removed and in an inverted position. It can be seen that the receiver 12 includes a disc-like plate 23 on which are mounted a meter 24 which operates the needle 16 and a motor 25 which serves to drive the odometer 17. A secondary plate 26 is mounted in spaced, parallel relationship to the plate 23 and receives the cable 13 in a manner which will be described more fully hereinafter.

Figure 3:
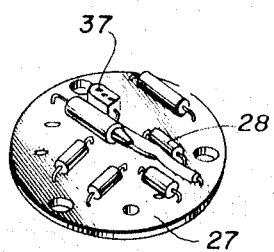
FIG. 3 is a perspective view of an important element of a transmitter forming part of the speedometer.

Referring to FIG. 3, a disc 27 forms part of the transmitter 11 and is made of a non-conducting substance. It is provided with a sender means, such as printed circuitry and a solid state circuit 28 which serves to emit electrical pulses in accordance with the rotation of the shaft 21 of the transmitter.

Figure 4:
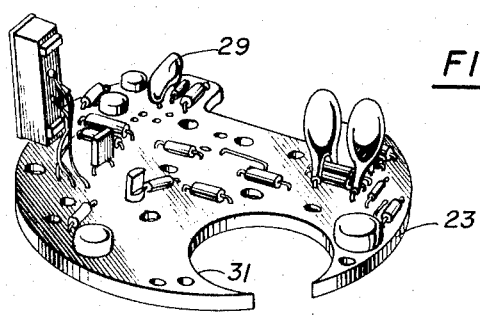
FIG. 4 is a perspective view of an important portion of the receiver forming part of the speedometer.

FIG. 4 shows the plate 23 of the receiver 12 and the manner in which it is provided with printed circuitry and solid state electronic elements to form a receiver circuit 29 which is electrically connected to the said sender means to receive the electrical pulses. The plate is provided with a large circular aperture 31 adapted to receive the motor 25 (not shown).

Figure 5:
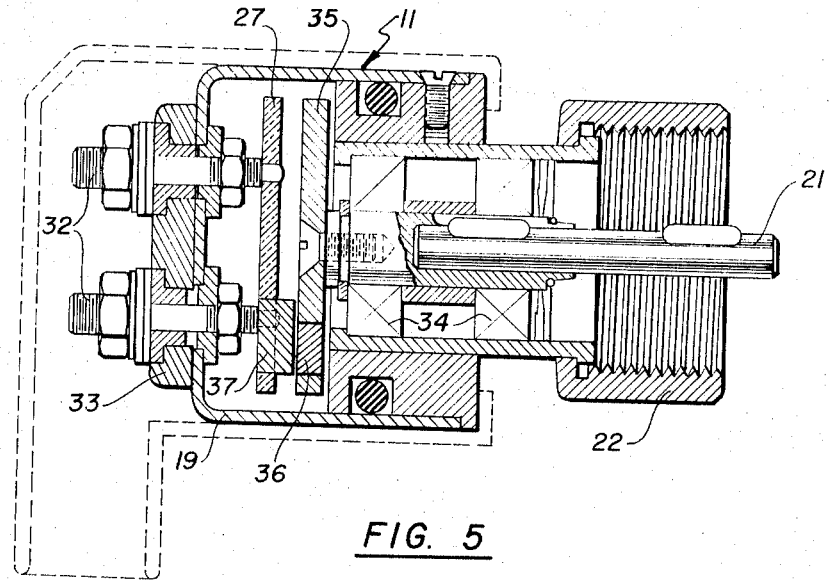
FIG. 5 is a sectional view of the transmitter taken on the line V—V of FIG. 1.

FIG. 5 shows the details of the transmitter 11. The housing 19 is connected by means of fasteners 32 to a structure 33 adjacent an output element of the prime mover. The shaft 21 is keyed to such a moving element of the prime mover and the two are locked together by means of the sleeve 22. The inner end of the shaft 21, which is mounted in gearings 34, is provided with a rotor 35 which is of disc-like configuration extending radially of the axis of the shaft 21. The rotor 35 is mostly constructed of aluminum, but is provided in one location with a plug 36 of ferrite. The disc 27 is mounted closely adjacent the rotor 35 and an element 37 is carried so that it lies in the path of the plug 36 as it moves with the rotor 35. The element 37 consists of a pair of coils would in a one-to-three ratio in such a way that the mutual inductance between them changes when the ferrite plug 36 passes over them.

Figure 6:
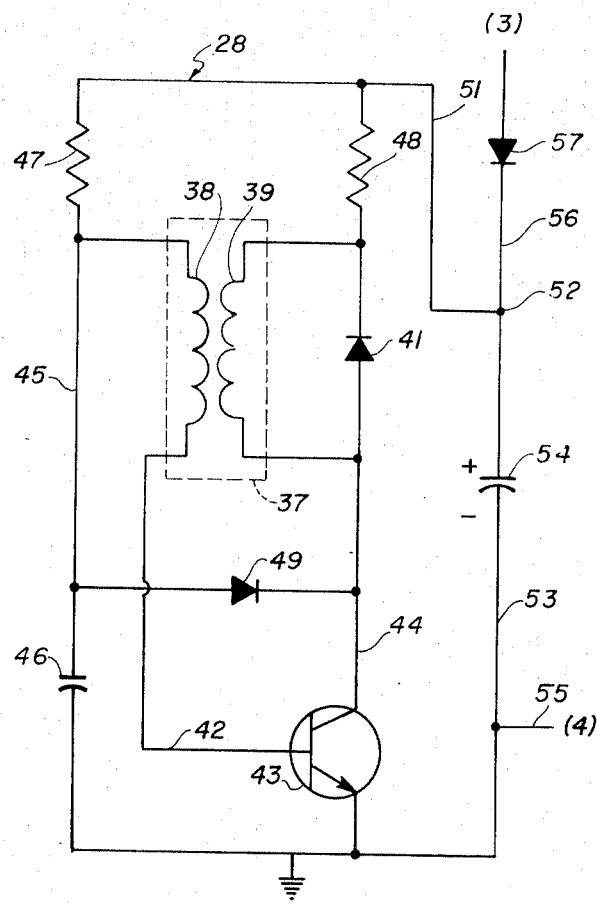
FIG. 6 is an electrical schematic diagram showing electrical portions of the transmitter.

In FIG. 6 it can be seen that the element 37 is made up of the two coils 38 and 39. Connected across the ends of the coil 39 is a rectifier 41. One end of the coil 38 is connected by a line 42 to the base of a 2N5828 transistor 43. The collector of the transistor 43 is connected by a line 44 to one end of the coil 39. The other end of the coil 38 is connected by a line 45 through a capacitor 46 to the emitter of the transistor 43. The same end of the coil 38 that is connected to the line 45 is connected through a resistor 47 and a resistor 48 in series to the other end of the coil 39, that is to say, the end of the coil 39 that is not connected to the line 44. The rectifier 49 is connected between the line 45 and 44 in such a way as to allow current flow only from the line 45 to the line 44. Similarly, the rectifier 41 is connected to allow flow of current only from the line 44 to the resistor 48. The common point between the resistor 47 and 48 is connected by a line 51 to a junction 52. The emitter of the transistor 43 and the line 45 adjacent thereto are connected by a line 53 through a capacitor 54 to the junction 52. The line 53 is connected by a wire 55 to a point (4), while the junction 52 is connected through a wire 56 through a rectifier 57 to a point (3), the rectifier only allowing current flow from the point (3) to the junction 52. The line 53 at the emitter of the transistor 43 is grounded.

Figure 7:
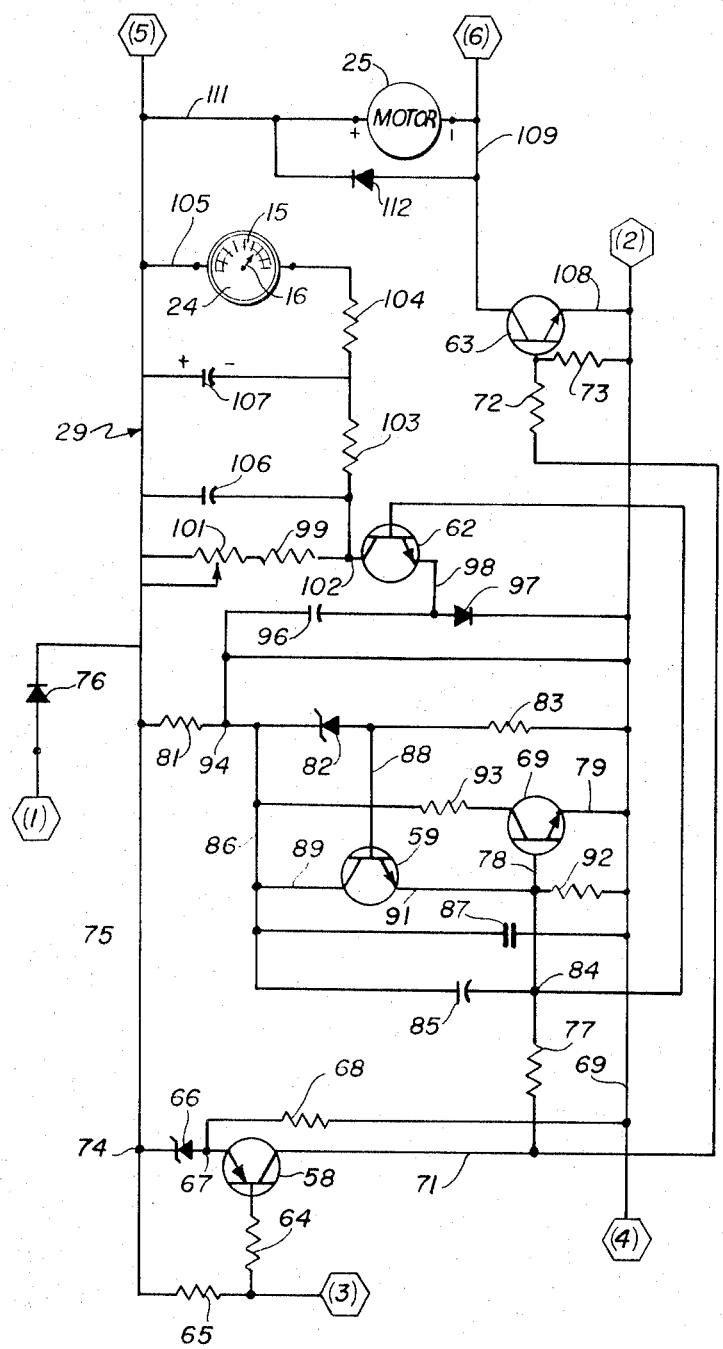
FIG. 7 is an electrical schematic showing important elements of the receiver.

FIG. 7 shows the electrical circuit 39 mounted on the plate 23 of the receiver. It shows the manner in which it is connected to the motor 25 which serves the odometer 17. It also shows the manner at which it is connected to the meter 24 which operates the needle 16 over the scale 15. Also of interest in connection with this circuit is the point (3) and the point (4) which it shares in common with the transmitter circuit 28. Included in the circuit 29 is a 2N5139 transistor 58 and several 2N3643 transistors 59, 61, and 62 and an SE6021 transistor 63. The base of the transistor 58 is connected through a resistor 64 to the point (3), while that same point is connected to a resistor 65, and other end of which is connected to one side of a zenor diode 66, the other side of which is connected to the emitter of the transistor 58. The diode 66 is arranged to control the voltage at the emitter with respect to the line 75. The junction 67 lies between the diode 66 and the emitter of the transistor 58 and is connected through a resistor 68 to a base line 69, an extension of which is also connected to the point (4). The collector of the transistor 58 is connected by a line 71 through a resistor 72 to the base of the transistor 63. A point between the resistor 72 and the base of the transistor 63 is also connected through a resistor 73 to the line 69. The junction 74 between the resistor 65 and the diode 66 is connected to a line 75. One point in the line 75 is connected through a rectifier 76 to a point (1) with the rectifier arranged to allow current only to go from the point (1) to the line 75. The mid-point of the line 71 between the transistor 58 and the resistor 72 is connected to one side of a resistor 77, the other side of which is connected through a line 78 to the base of the transistor 61. The emitter of that transistor is connected by a line 79 to the base line 69. The line 75 is connected through a resistor 81, the zenor diode 82, and a resistor 83 to the base line 69, the diode being arranged to control the voltage level between the resistor 83 and the resistor 81. The junction 84 is connected through the capacitor 85 through a line 86 to a point between the resistor 81 and the diode 82. The line 86 is connected to the base line 69 through a capacitor 87.

The base of the transistor 59 is connected by a line 88 to a point between the resistor 83 and the diode 82; its collector is connected by a line 89 to the line 86, while its emitter is connected by a line 91 to the line 78 and (from the point of connection thereto) through a resistor 92 to the base line 69. The collector of the transistor 61 is connected through a resistor 93 to the line 86, while its emitter, as has been stated, is connected through the line 79 to the base line 69.

The junction 94 which lies between the diode 82 and the resistor 81 is connected to the base line 69. The same point is also connected through a capacitor 96 and a rectifier 97 to the base line 69. The rectifier 95 is arranged to allow current flow only from the base line 69 to the junction 94, while the rectifier 97 is arranged to allow current flow only from the capacitor 96 toward the base line 69.

The emitter of the transistor 62 is connected by a line 98 to a junction line between the capacitor 96 and the rectifier 97. Its collector, however, is connected through a resistor 99 and a resistor 101 in series to the line 75. The junction 102 between the collector of the transistor 62 and the resistor 99 is connected through a resistor 103, and a resistor 104 in series to one side of the meter 24, the other side of which is connected by a line 105 to the line 75. The capacitor 106 is connected from the junction 102 to the line 75 and the line 75 is also connected through a capacitor 107 to a point between the resistors 103 and 104. The emitter of the transistor 63 is connected by a line 108 to the line 69 and also to a point (2). Its collector, on the other hand, is connected by a line 109 to one side of the motor 25 and also to a point (6). The other side of the motor 25 is connected by a line 111 not only to the line 75 by also to a point (5). The rectifier 112 is connected across the two sides of the motor 25 so that current can flow only from the line 109 to the line 111.

Figure 8:
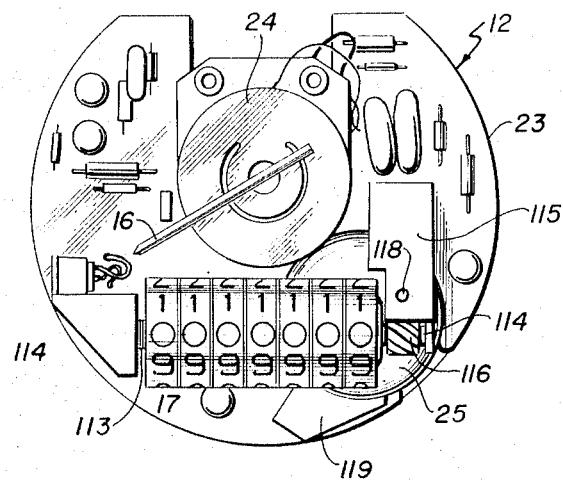
FIG. 8 is a front elevational view of a receiver forming part of the speedometer.
Figure 9:
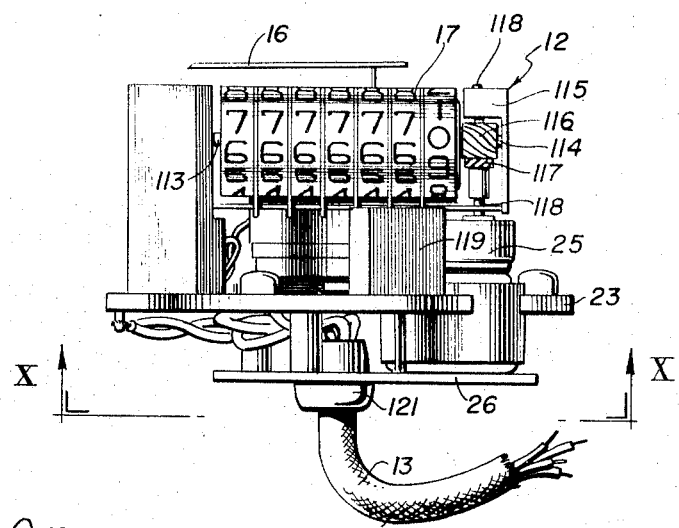
FIG. 9 is a bottom view of the receiver.
Figure 10:
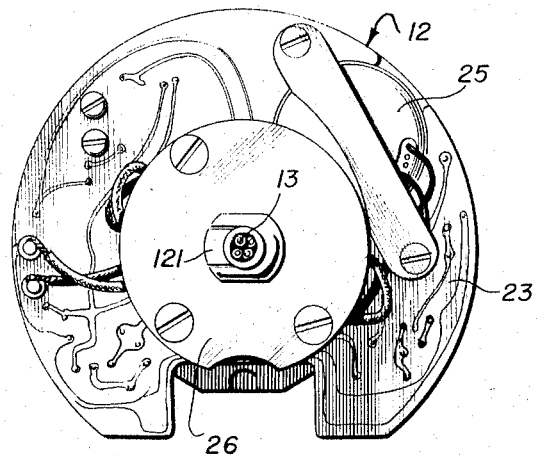
FIG. 10 is a rear view of the transmitter of the receiver taken on the line X—X of FIG. 9.

FIGS. 8, 9, and 10 shows the general mechanical arrangement of the parts of the receiver 12 with the face plate removed. The odometer 17 is shown as being of the cylindrical type having an axial shaft extending from each end. One shaft 113 is carried in a block 114 which is fastened to the back surface of the plate 23. The other shaft 114 is carried in a block 115 which is also mounted on the plate 23.

Mounted on the shaft 114 is a worm element 116 which engages a similar worm element 117 mounted on the output shaft 118 of the motor 25, the speed of the motor having been suitably reduced by passage through gear box. In the preferred embodiment, the work element 116 is formed of brass, while the worm element 117 is made of nylon. The upper end of the shaft 118 is carried in a projection of the block 115, as is evident in FIGS. 8 and 9.

A block 119 is also fastened to the plate 23 so as to hold the motor 25 firmly in place. As is evident in FIG. 9, the cable 13 includes four wires. It is tightly clamped and sealed by a suitable grommet 121 in an aperture in the center of the secondary plate 26.

The operation of the apparatus will now be readily understood in view of the above description. When the receiver 12 has been suitably mounted in the instrument panel of a vehicle and the transmitter 11 connected to a portion of the drive train of the prime mover of the vheicle, the shaft 21 is rotated by the operation of the vehicle. The rotation of the shaft 21 causes a similar rotation of the rotor 34 and causes the ferrite plug 36 to pass once every revolution past the element 37 and its coils 38 and 39. The change in the mutual inductance between the coils 38 and 39 causes the formation of a pulse and this pulse appears between the points (3) and points (4) for passage through the cable 13 to the receiver 12. When the pulse reaches the points (3) and (4) in the circuit 29 shown in FIG. 7, this circuit operates to shape the pulse and to arrange them to drive the motor 25. At the same time, the rate that the pulses arrive at the circuit 29 appears as a voltage across the meter 24 and causes the needle 16 to indicate the speed of the vehicle.

Referring to FIGS. 8, 9 and 10, the rotation of the shaft 118 of the motor 25 operates through the worm element 116 and 117 to rotate the shaft 114 of the odometer 17 and to register an accumulative effect on it to show the total mileage traveled by the vehicle. When operated in this manner, the speedometer of the invention will deliver years of service on such vehicles as heavy-duty trucks. The costly maintenance repairs and replacement of standard speedometers that has been necessary in the past (because of their flexible shafts) has been eliminated, due to the fact that moving wearing parts have been reduced to a minimum and the torque and friction on bearing surfaces has been minimized. The rotating aluminum disc or rotor 34 in the transmitter 11 is the only moving part in that element. It comes in contact with nothing but its bearings; it touches nothing and it drives nothing. The speedometer is connected to the vehicle battery, but the power required is only 3 watts, or approximately the power required to operate a small instrument light bulb. In a receiver circuit, the pulses are divided electronically with one of the pulse signals being directed to the motor driving the odometer and the other signal going to the speed meter to provide speed and indication. In the preferred embodiment, the stepping motor and the reduction gear box (shown as the motor 25) are in a sealed unit and the speedometer is shielded at both ends to prevent foreign material from getting into the movement, so that the entire package is silent running. Compensation takes place electronically so that accuracy will be maintained over a broad temperature range. The circuit includes a regulating function, so that a fluctuating battery voltage will not affect the instrument. The speed meter is provided with damping to prevent indicating needle flutter and there is polarity protection so that the unit will not be damaged if the power leads are reversed during installation.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A speedometer, comprising:
   a. a transmitter including a rotatable shaft adapted to be connected to a rotating part of a prime mover and including sender means to emit electrical pulses in accordance with the rotation of the shaft,
   b. a remote receiver electrically connected to the said sender means to receive the electrical pulses, the receiver including a disc-like plate having a circular aperture, the plate acting as a circuit board for electronic components,
   c. a meter connected to the receiver and having a needle whose position is indicative of the instantaneous speed of the said prime mover, the meter being fixed to the plate,
   d. a motor passing through the aperture in the plate and having an output shaft whose rate of rotation is indicative of the speed of the prime mover, the motor being held in a fixed position relative to the plate by a first and second fixture on a first side of the plate, fixed to the plate, the fixtures engaging a first end of the motor, and a third fixture which engages a second end of the motor and is fixed to the first and second fixtures through the plate, e. a mechanical odometer driven by the said shaft of the motor and indicating the accumulation of movement of the prime mover, the odometer being fixed to the plate, and f. circuit means including electronic components mounted on said plate and connected to said sender means to receive the electrical pulses therefrom and connected to said meter and said motor to provide energizing signals thereto.

2. A speedometer as recited in claim 1, wherein the odometer is carried by the first fixture.

3. A speedometer as recited in claim 1, wherein the sender includes two coils and a disc fixed to the rotatable shaft, the two coils being adjacent a single side of the disc.

\* \* \* \* \*